(12) United States Patent
Dalmatov et al.

(10) Patent No.: US 11,157,209 B2
(45) Date of Patent: Oct. 26, 2021

(54) STORAGE ALLOCATION TECHNIQUES USING LOGICAL REGION I/O ACCESS INFORMATION AND TEMPORAL TREND PREDICTION

(71) Applicant: EMC IP Holding Company LLC, Hopkinton, MA (US)

(72) Inventors: Nickolay A. Dalmatov, St Petersburg (RU); Kirill Aleksandrovich Bezugly, St Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 16/666,789

(22) Filed: Oct. 29, 2019

(65) Prior Publication Data

US 2020/0233612 A1     Jul. 23, 2020

(30) Foreign Application Priority Data

Jan. 22, 2019 (RU) .............................. JP2019101645

(51) Int. Cl.
*G06F 12/00*     (2006.01)
*G06F 3/06*      (2006.01)

(52) U.S. Cl.
CPC .......... *G06F 3/0659* (2013.01); *G06F 3/0604* (2013.01); *G06F 3/0631* (2013.01); *G06F 3/0644* (2013.01); *G06F 3/0653* (2013.01); *G06F 3/0685* (2013.01)

(58) Field of Classification Search
CPC ...... G06F 3/0644; G06F 3/0611; G06F 3/068; G06F 3/0689; G06F 12/02; G06N 20/20; G06K 9/6267
See application file for complete search history.

(56) References Cited

U.S. PATENT DOCUMENTS 9,703,664 B1 *  7/2017  Alshawabkeh ......... G06F 3/061

OTHER PUBLICATIONS

Kirill Aleksandrovich Bezugly, et al., "Improving Automated Storage Tiering by Access Pattern Detection and Temporal Trend Prediction", U.S. Appl. No. 16/666,774, filed Oct. 29, 2019.

* cited by examiner

*Primary Examiner* — Shawn X Gu
(74) *Attorney, Agent, or Firm* — Muirhead and Saturnelli, LLC

(57) ABSTRACT

Techniques for processing I/O operations may include: receiving a write I/O operation that writes first data to a target logical address in a logical address range, wherein physical storage is currently unallocated for the target logical address; selecting a first storage tier from which to allocate first physical storage for storing the first data, wherein said selecting uses first I/O access information characterizing I/O activity of a first logical region and performance and capability characteristics of storage tiers to select the first storage tier; allocating first physical storage from the first storage tier; and storing the first data in the first physical storage. The target logical address may be located in the first logical region. The target logical address may alternatively be located in another logical region predicted, based on temporal trends and application profile information, to include the target logical address at a future point in time.

21 Claims, 6 Drawing Sheets

STORAGE ALLOCATION TECHNIQUES USING LOGICAL REGION I/O ACCESS INFORMATION AND TEMPORAL TREND PREDICTION

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems, such as data storage arrays. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of processing I/O operations comprising: receiving a write I/O operation that writes first data to a target logical address in a logical address range, wherein physical storage is currently unallocated for the target logical address; selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier; allocating first physical storage from the first storage tier; and storing the first data in the first physical storage. The first logical region may have an associated first subrange of the logical address space. The first subrange may have an upper bound and a lower bound, and wherein a plurality of write I/O operations may have been made to target logical addresses in the first subrange prior to receiving the write I/O operation. The method may include determining whether the target logical address is located in the first logical region of the logical address range; and responsive to determining the target logical address is located in the first logical region, selecting the first storage tier in accordance with the first I/O access information associated with the logical region. The logical address range may include a plurality of logical regions to which writes have been made. Each of the plurality of logical regions may be associated with I/O access information characterizing I/O activity of said each logical region, and said plurality of logical regions may include the first logical region. The method may include: determining whether the target logical address is located within a logical region of the logical address range that does not have associated I/O access information characterizing I/O activity of the logical region; and responsive to determining that the target logical address is located within a logical region of the logical address range that does not have associated I/O access information characterizing I/O activity of the logical region, performing processing. The processing may include determining, using temporal trend information regarding the plurality of logical regions, whether the target logical address is predicted to be included in the first logical region at a future point in time; and responsive to determining that the target logical address is predicted to be included in the first logical region at a future point in time, performing said selecting of the first storage tier using the first I/O access information characterizing I/O activity of the first logical region. The temporal trend information may indicate that the first logical region has been expanding over time and thereby increasing in size with respect to a logical address subrange associated with the first logical region. The temporal trend information may indicate that the first logical region has been decreasing in size over time with respect to a logical address subrange associated with the first logical region. The temporal trend information may indicate that an upper bound logical address of the first logical region changes over time. The temporal trend information may indicate that a lower bound logical address of the first logical region changes over time. The temporal trend information may indicate that at least one of a lower bound logical address of the first logical region and an upper bound logical address of the first logical region has not changed over time. Each of the plurality of logical regions may include data portions having matching I/O access characteristics for a same defined time period. At least two of the plurality of logical regions may be different in terms of size with respect to the logical address space. At least one of the plurality of logical regions may include a plurality of slices allocated from one of the plurality of storage tiers. The plurality of storage tiers may include at least one tier of solid state storage devices and at least one tier of rotating disk drives. The first physical storage may be allocated from any of a particular RAID group of the first storage tier and a particular physical storage device of the first storage tier may be selected in accordance with at least one characteristic identified by the first I/O access information. The write I/O operation may be an initial write to the target logical address. The write I/O operation may be directed to a logical device having the logical address range, and wherein the logical device is virtually provisioned having physical storage allocated on demand. Physical storage for a subrange of the logical address range of the logical device may be allocated responsive to an initial write to any logical address in the subrange. The logical address range may include a plurality of logical regions to which writes have been made. Each of the plurality of logical regions may be associated with I/O access information characterizing I/O activity of said each logical region. The plurality of logical regions may include the first logical region, and wherein application profile information for the logical device may identify any one or more of: an application expected to issue I/Os to the logical device; a type of application expected to issue I/Os to the logical device; and a type of storage object expected to have data stored on the logical device. The method may include determining whether the target logical address is located within a logical region of the logical address range that does not have associated I/O access information characterizing I/O activity of the logical region; responsive to determining that the target logical address is located within a logical region of the logical address range that does not have associated I/O access information characterizing I/O activity of the logical region, performing processing. The processing may include determining, using the application profile information and temporal trend information regarding the plurality of logical regions, whether the target logical address is predicted to be included in the first logical region at a future point in time; and responsive to determining that the target logical address is predicted to be included in the first logical region at a future point in time, performing said selecting of the first storage tier using the first I/O access information characterizing I/O activity of the first logical region.

In accordance with another aspect of techniques herein is a computer readable medium comprising code stored thereon that, when executed, performs a method of processing I/O operations comprising: receiving a write I/O operation that writes first data to a target logical address in a logical address range, wherein physical storage is currently unallocated for the target logical address; selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier; allocating first physical storage from the first storage tier; and storing the first data in the first physical storage.

In accordance with another aspect of techniques herein is a system comprising: at least one processor; and a memory comprising code stored thereon that, when executed, performs a method of processing I/O operations comprising: receiving a write I/O operation that writes first data to a target logical address in a logical address range, wherein physical storage is currently unallocated for the target logical address; selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier; allocating first physical storage from the first storage tier; and storing the first data in the first physical storage.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
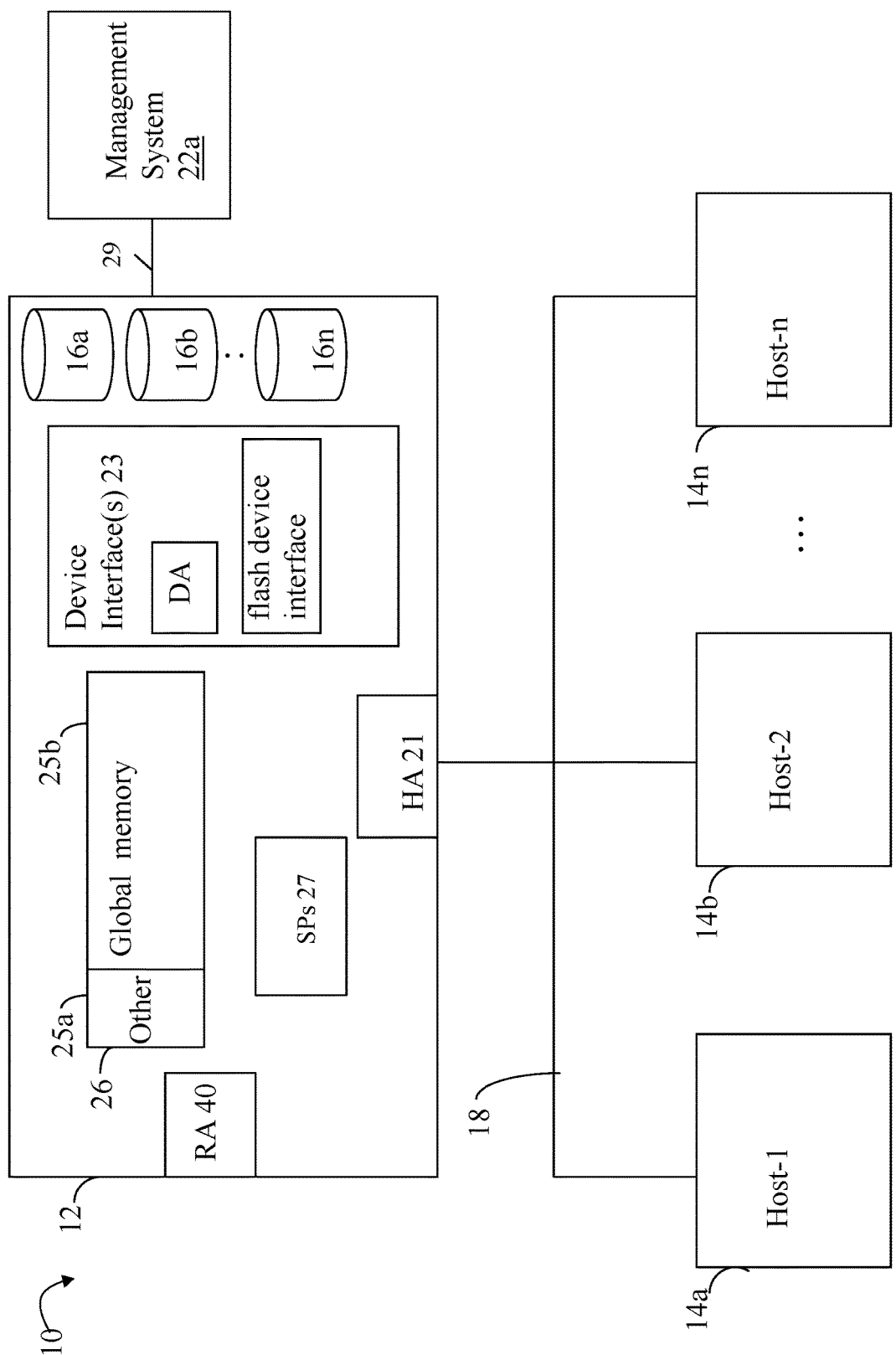
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. The hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. For example, at least some of the flash devices may be constructed using nonvolatile semiconductor NAND flash memory. The flash devices may include, for example, one or more SLC (single level cell) devices and/or MLC (multi level cell) devices.

As known in the art, flash devise or drives have an expected lifetime (e.g., as measured in an amount of actual elapsed time such as a number of years, months, and/or days) based on a number of guaranteed write cycles, or program cycles, and a rate or frequency at which the writes are performed. A flash device may be expected to have a usage measured in calendar or wall clock elapsed time based on the amount of time it takes to perform the number of guaranteed write cycles. Thus, flash devices have a wear out or lifetime based on the number of expected writes or erasure cycles prior to failure. Furthermore, PDs of the different SSD media types, such as MLC or SLC, may have different write endurance levels and characteristics.

Within a lifetime or usage period, the amount of writes that each type of flash drive, such as MLC or SLC, may be expected to successfully sustain varies. For example, with SLC, one bit of information or data is stored per cell. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as a type of flash having a higher write endurance than the MLC device. Furthermore, the SLC device may be generally included in first write endurance classification associated with a first level of write endurance and the MLC device may be generally included in a second write endurance classification associated with a second different level of write endurance. More generally, additional or different SSD media types having different write endurance classifications may be used in an embodiment in accordance with techniques herein.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers) used to interface with the flash drives and/or other non-volatile physical data storage devices 16a-n. The DAs may also be characterized as back end components of the data storage system which interface with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22*a* that may be used to manage and monitor the system 12. In one embodiment, the management system 22*a* may be a computer system which includes data storage system management software or application such as may execute in a web browser. A data storage system manager may, for example, view information about a current data storage configuration such as LUNs, storage pools, and the like, on a user interface (UI) in a display device of the management system 22*a*. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16*a*-16*n*. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22*a* to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In at least one embodiment of a data storage system in accordance with techniques herein, multiple logical device types may be supported. Thus, LUNs corresponding to logical devices may be any selected one of the supported logical device types. For example, in at least one embodiment, a LUN may be configured as a thin device (also referred to as a virtually provisioned logical device), or a thick logical device (also referred to as a regular logical device). For regular or thick LUNs, physical storage for the LUN is provisioned for the full capacity of the LUN at time of configuration or creation. For thin or virtually provisioned LUNs, physical storage for the LUN is not provisioned for the full capacity of the LUN at time of configuration or creation. Rather for thin LUNs, physical storage for the LUN is allocated on demand, as needed over time, in response to first initial writes to the LUN's logical address space. For example, a thin LUN may be configured at a first point in time and no physical storage is allocated or mapped to the thin LUN's logical address space. At a second later point in time, a write to a target logical address of the LUN results in a slice of physical storage being allocated for storing the written data. Additionally, the slice of physical storage is mapped to a portion of the thin LUN's logical address space, where the portion includes the target logical address. Subsequent writes to the portion of the thin LUN's logical address may also result in storing the written data to the same slice. In this manner, as initial first writes are made to different portions of the thin LUN's logical address space that are not mapped to physical storage (e.g., for which storage is unallocated), additional physical storage slices may be allocated and mapped into the thin LUN's logical address space.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers an SSD tier of flash-based drives, a tier of 15K RPM rotating disk drives (hard disk drives (HDDs)), and a tier of 10K RPM rotating disk drives (HDDs). The foregoing 3 storage tiers may be ranked based on performance where the SSD tier may be ranked as the highest, the tier of 15K RPM drives ranked second highest and the tier of 10K RPM dries ranked lowest/least in terms of performance. A data portion, such as mapped to a subrange of a LUN logical address space, may be relocated between different ones of the foregoing 3 tiers in an automated fashion based on the activity, temperature, or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10K or 15K RPM tier. At yet a third point in time subsequent to the second point in time, the data portion may be frequently accessed again and may be promoted to a higher performing tier (e.g., relocated from the 10K or 15K RPM tier to the SSD tier). In at least one embodiment, the automated movement of data portions between different storage tiers dynamically over time in accordance with the I/O activity directed to the different data portions may be performed by a data storage optimizer. Such automated movement of data portions between storage tiers may also be referred to as automated storage tiering or auto-tiering performed to improve data storage system performance, such as improve I/O performance.

Figure 2:
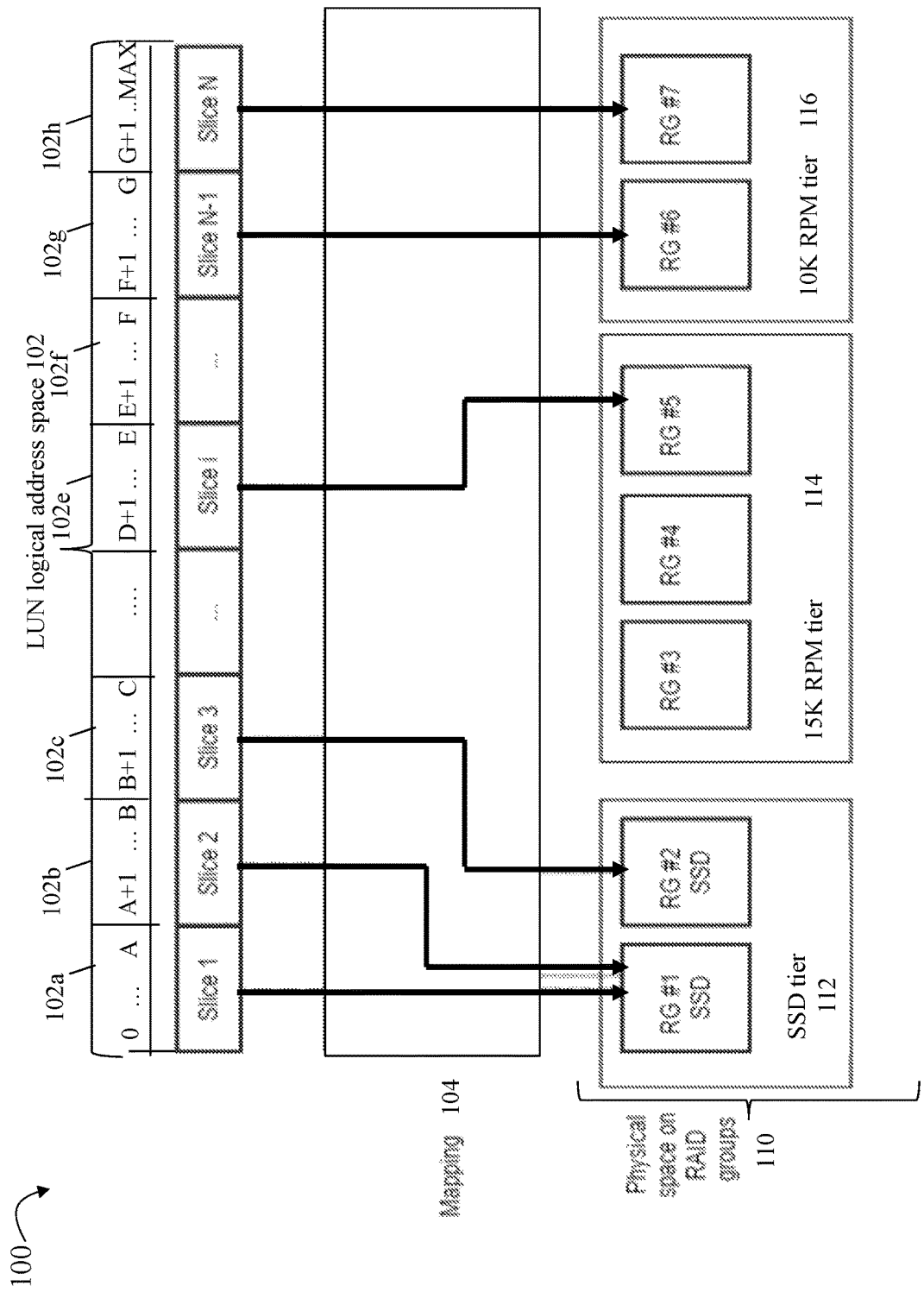
FIG. 2 is an example illustrating mapping of a logical address space to physical storage in a system in an embodiment in accordance with techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16a-n in FIG. 1. The example 100 include storage tiers 112 (SSD tier), 114 (15K RPM tier) and 116 (10K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102a-h) where each of the portions 102a-h is mapped to a portion of physical storage, also referred to as slices or segments, on the different PDs of different ones of the storage tiers of 110. As noted above, data storage system software may periodically remap data stored in different logical portions of the LUN's logical address space to keep the most actively used or accessed portions of 102a-n on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In some existing systems not using techniques herein, the automated storage tiering and movement of data between different storage tiers may be based on the I/O activity observed over a time period directed to each individual data portion as stored on physical storage. The I/O activity information may be collected per slice of mapped physical storage. Use of such metrics for I/O activity, such as based on a simple moving average I/O activity for the individual slices, may be insufficient for predicting periodic I/O changes. Additionally, the existing systems not using techniques herein may determine the I/O activity directed to different individual physical storage slices without regard to the associated logical addresses.

In connection with a LUN that is a thin or virtually provisioned logical device, physical storage may be allocated on demand as described above. Initially, no logical addresses of the thin LUN's logical address space are mapped to physical storage. Thus, the first or initial time that data is written to a target logical address of a thin LUN that is not mapped to physical storage (e.g., target logical address is unallocated), physical storage, such as a slice, is allocated from a selected tier and mapped into a portion of the thin LUN's logical address space. Since this is an initial slice allocation with no I/O previously issued to the target logical address of the thin LUN, there may be no associated I/O activity information available for use in connection with selecting the tier from which the allocate the slice.

For such an initial slice allocation, some systems have specify a policy that identifies what default tier to place newly written data. For example, the policy may indicate to store data of a particular LUN on an SSD tier by default, such as when making an initial slice allocation, when writing to an LBA with no associated I/O access or activity history, and the like. Some systems may also use a policy which indicates to select a tier in accordance with the current distribution of the LUN's data among all tiers. For example, if 50% of the LUN's data is on the SSD tier and 50% on the 15K RPM tier, a round robin technique may be used to alternate between placing such data written to an LBA having no associated I/O access or activity history on the SSD tier and the 15K RPM tier (resulting in 50% of new slices being allocated from each of the SSD and 15K RPM tiers).

To address the above-noted problems and deficiencies, described in following paragraphs and figures are techniques that include analyzing how I/O activity or access is distributed, and may change dynamically over time, with respect to the logical address space associated with data portions. Such analysis may identify changes over time, for example, such as related to changes over time in I/O activity type and workload levels, and changes over time in logical regions accessed (e.g., where the defined logical regions having associated logical address subranges may change over time). Based on such analysis, I/O activity or access patterns and associated trends may be identified and used to predict the expected I/O activity and associated characteristics at different logical address space subranges or regions at different points in time. Such predictions may be used in connection with selecting different storage devices and different storage tiers upon which different data portions of different logical address space regions are placed at different points in time. Each of the identified logical address space regions and associated logical address subrange may be mapped to multiple slices of physical storage within the same storage tier. Data movements or relocations may be performed with respect to an identified logical region where data stored on multiple slices (having corresponding logical addresses in the logical region) may be placed, moved or relocated as a unit among suitable storage tiers.

In at least one embodiment in accordance with techniques herein, physical storage may be allocated and mapped to logical addresses in units referred to as slices, as discussed above. The slices may be of the same size, or of varying sizes, depending on the particular embodiment. In at least one embodiment, the data movement size granularity may also be a single size (e.g., where data is relocated or moved in chunks of the same size) or may be of varying sizes (e.g., where data is relocated or moved in chunks that may be of different sizes), depending on the particular embodiment. The data movement size granularity denotes the unit or size of data chunks moved or relocated between storage tiers, such as by a data storage optimizer as discussed elsewhere herein.

In at least one embodiment, different subranges of the logical address space of a LUN may be accessed by an application based on the particular access patterns of the application. Such logical address subranges may correspond, for example, to different abstract or logical storage objects used by the application. Additionally, different subranges may have different associated I/O access patterns as may vary with the particular logical storage objects and associated uses by the application. For example, a file system including multiple files may be stored on a LUN where each of the different files may be a different storage object having its own I/O access pattern based on how and when the application accesses (e.g., issues I/Os to) such files. Each of the different files may have its data stored in a different subrange of the LUN's logical address space. Thus, techniques herein may be used to analyze how I/O activity or access is distributed and changes dynamically over time in the logical address space of the LUN. Techniques herein may identify the different logical address subranges or regions of the LUN and I/O access patterns associated with the different files of the file system, and use such information to identify trends and predict the expected I/O patterns over time to the different logical address subranges or regions. Data portions in a logical region may be characterized as having matching or similar I/O access characteristics within a same time frame or time period. For example, a logical region corresponding to a file of the file system may be determined in accordance with a logical address subrange having common or similar I/O access characteristics with respect to data portions of the region.

Techniques herein may use I/O access or activity information and I/O access predictions as generated based on the logical regions of the logical address space to determine from what tier to allocate physical storage, such as in connection with initially writing to an unmapped target logical address for which no physical storage is currently allocated. When writing to an LBA of a LUN where the LBA has no associated I/O access or activity information, techniques herein may determine the predicted or expected I/O intensity and I/O access pattern for the LBA based on the LBA relative to the LUN's logical address space. Techniques herein may select the storage tier determined as best suited for the predicted I/O access or activity (e.g., I/O type and intensity) of the target logical address, even though no data may have yet been written to the target logical address. The foregoing and other aspects of techniques herein are described in more detail in following paragraphs and figures.

In following examples, reference may be made to the logical address space of a single LUN for purposes of illustration of techniques herein. More generally, such techniques may be applied with respect to multiple logical address spaces of multiple LUNs. Additionally, following examples make reference to use of techniques herein in connection with a LUN that is a thin or virtually provisioned LUN. However, as will be appreciated by those of ordinary skill in the art, techniques herein have more general applicability and are not limited to use with only thin LUNs.

Figure 3A:
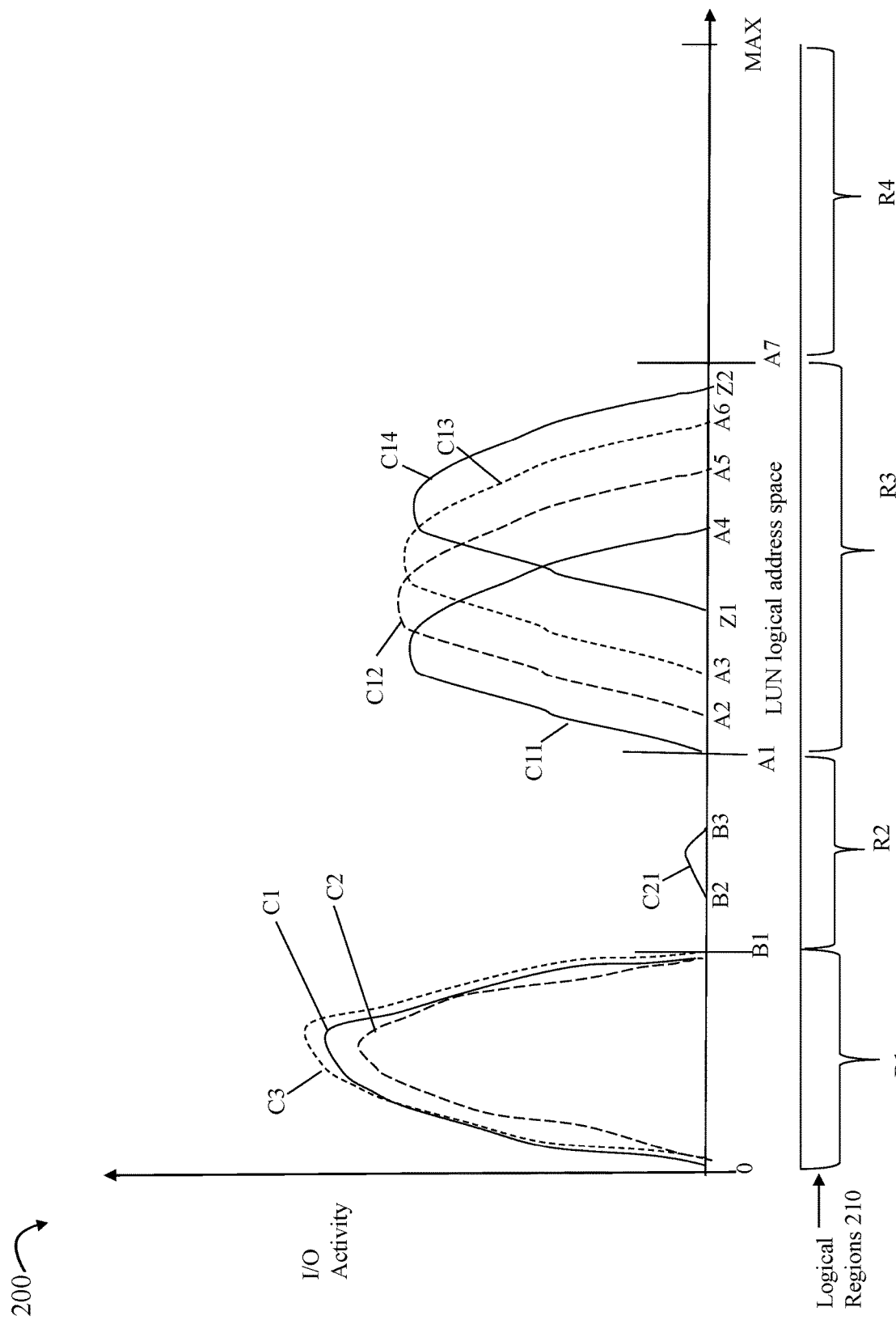
FIGS. 3A and 3B are examples illustrating use of techniques herein in connection with logical address spaces having different logical regions and associated I/O activity or access information across time.

Referring to FIG. 3A, shown is an example 200 providing a graphical illustration of an embodiment in accordance with techniques herein. In the example 200, the graph illustrates I/O activity or workload level on the Y axis and the LUN logical address space on the X axis. The LUN logical address space of the X axis is illustrated as ranging from logical address 0 to MAX similar to that as described above (e.g., FIG. 2). The Y axis denotes the level of I/O activity or workload. For example, I/O activity or workload of the Y axis may be a numerical quantity denoting the I/O activity or workload such as in I/Os per second (e.g., I/O rate), read I/O per second amount of data read and/or written per second, and the like. R1, R2, R3 and R4 may denote different logical address space subranges or regions 210 of the LUN's logical address space. In the example 200, R1, R2 and R3 may denote logical address subrange portions to which writes have been issued and therefore include stored user data. R4 may denote an unused logical address subrange to which no writes have yet been issued (e.g., R4 does not include user data/has not been used to store user data). In this example, R1-R4 are illustrated as having different sizes in terms of subranges. Generally, number and size of the logical regions identified using techniques herein may vary with the particular I/O activity observed at different points in time across the LUN logical address space.

The example 200 illustrates a LUN logical address space on the X axis for a thin or virtually provisioned LUN. For the thin LUN, since no writes have yet been issued to region R4, no physical storage slices are mapped to the logical address subrange A7 to MAX, where A5 denotes the lower bound (LB) logical address of R4 and MAX denotes the upper bound (UB) logical address of R4. It should be noted that R2 may be characterized as a sparse logical region in one aspect with respect to mapped slices. For example, data may have been written to the logical address subrange, B2 through B3, whereby one or more slices are currently mapped to the logical address subrange, B2 through B3. The logical address subranges B1 to B2, and B3 to A1, in this example have not been written to and thus do not contain any user data and are not mapped to any physical storage (e.g., similar to that as described for region R4).

The example 200 illustrates the distribution of I/O activity or access over time across the LUN logical address space on the Y axis, as will now be described in more detail.

Curves C1, C2 and C3 may denote the observed I/O activity in logical region R1, respectively, at three subsequent points in time or time periods T1, T2 and T3. Each of the curves C1, C2 and C3 also span the entire logical address subrange, 0 through B1, of logical region R1. C1 indicates the I/O activity in logical region R1 at a first point in time T1 at which I/O activity or access information is collected for a first time period. C2 indicates the I/O activity in logical region R1 at a second point in time T2 (subsequent to T1) at which I/O activity or access information is collected for a second time period. C3 indicates the I/O activity in logical region R1 at a third point in time T3 (subsequent to T2) at which I/O activity or access information is collected for a third time period. In this example, assume that C1, C2 and C3 denote I/O activity for R1 where the I/O activity observed at the points in time indicate that only a large amount of reads/read data (including both sequential and random), but no writes, have been directed to a logical address in the logical address subrange denoted by R1. As such, each of C1, C2 and C3 denote high read-only I/O activity or workload directed to logical region R1. Based on the collected information C1-C3, respectively, for the time periods T1-T3, it may be observed from the graphical illustration 200 that the I/O access pattern for R1 with only reads, but no writes, has an associated high read I/O workload level or intensity that remains relatively constant during the observed time periods T1-T3 (e.g., approximately the same, within specified threshold conditions such as within a defined range of read activity).

Curve C21 may denote the observed I/O activity in the logical address subrange, B2 through B3, of logical region R2 at point in time or time period T1. Generally C21 indicates a very low level of I/O activity for time period T1. The I/O access pattern denoted by C21 may be a very low read-only I/O workload. For time periods T2 and T3, the I/O activity or access information may be idle for R2 where no I/Os are directed to any logical address in the logical region R2 (thus no curve is illustrated for R2 for time periods T2 and T3 in this example).

Curves C11, C12 and C13 may denote the observed I/O activity in logical region R3, respectively, at three subsequent points in time or time periods T1, T2 and T3. C11 indicates the I/O activity in the logical address subrange 1, A1 through A4, of logical region R3 at the first point in time T1 at which I/O activity or access information is collected for a first time period. C12 indicates the I/O activity in the logical address subrange 2, A2 through A5, of logical region R3 at the second point in time T2 at which I/O activity or access information is collected for a second time period. C13 indicates the I/O activity in the logical address subrange 3, A3 through A6, in logical region R3 at the third point in time T3 at which I/O activity or access information is collected for a third time period. In this example, assume that C11, C12 and C13 denote I/O activity observed at the points in time indicate that only a high level of writes/write data (including both sequential and random writes), but no reads, have been directed to a logical address in the logical address subrange denoted by R3. As such, each of C11, C12 and C13 denote high write only I/O activity or workload directed to different logical subranges of R3. Based on the collected information C1-C3, respectively, for the time periods T1-T3, it may be observed from the graphical illustration 200 and analysis that the I/O access patterns of only writes, but no reads, has an associated high I/O workload level or intensity that remains relatively constant over the 3 observed time periods T1-T3 (e.g., approximately the same, within specified threshold conditions such as within a defined range of write activity).

Based on such collected I/O activity or access information distributed in time across the LUN logical address space as illustrated in FIG. 3A, analysis may determine a trend with respect to the I/O access pattern of logical region R3. Analysis may indicate that the I/O access pattern directed to R3 is writes to different subranges of the logical region R3 which shift or change over time and where each subrange is approximately the same size in terms of logical address span. As time elapses, writes are issued to logical address subranges of R3 where the beginning and ending of the subrange increase with each point in time. For example, it may further be determined that the incremental difference/distance between the starting point A1 of subrange 1 and the starting point A2 of subrange 2 is approximately the same (e.g., within specified threshold) as the incremental difference/distance between starting point A2 of subrange 2 and starting point A3 of subrange 3. Furthermore, it may further be determined that the incremental difference/distance between the ending point A4 of subrange 1 and the ending point A5 of subrange 2 is approximately the same (e.g., within specified threshold) as the incremental difference/distance between ending point A5 of subrange 2 and ending point A6 of subrange 3. As such, trending may use such collected information (e.g., C11, C12 and C13, respectively, from time periods T1, T2 and T3) to predict that at a subsequent point in time T4 (subsequent to T3) the I/O access pattern of writes may be directed to a fourth subrange of the logical region R4. Curve C14 may denote the predicted I/O access pattern of writes for the predicted fourth subrange. The fourth subrange may have a starting logical address, as denoted by Z1, equal to A3 plus an amount determined in accordance with (e.g., average of) the incremental difference/distance between consecutive pairs of starting points of the 3 subranges in R3 as noted above. The fourth subrange may have an ending logical address, as denoted by Z2, equal to A6 plus an amount determined in accordance with (e.g., average of) the incremental difference/distance between consecutive pairs of ending points of the 3 observed logical address subranges in R3 as noted above. Furthermore, analysis may determine that the distance or span of subrange 1 (A4-A1), subrange 2 (A5-A2) and subrange 3 (A6-A3) are all approximately the same (e.g., within a specified threshold or tolerance).

Thus, information collected for the 3 time periods T1-T3 may be analyzed and used to identify and predict the trend for subsequent time periods, such as T4, in connection with R3 as noted above. In a similar manner, information collected for time periods T1-T3 may be analyzed and used to predict a trend for R1, for time period T4, which indicates an expected read-only I/O workload that is similar to observed read only I/O workloads C1-C3 observed, respectively, for time periods T1-T3. Information collected for time periods T1-T3 (e.g., curve C21) may be analyzed and used to predict a trend for R2, for time period 4, which indicates generally an expected low or idle I/O workload that is similar to the I/O workloads observed for time periods T1-T3. Similarly, predictions based on the detected trends may be used to generally predict or forecast additional time periods subsequent to T4. For example, based on the trend detected for R3, it may be predicted that writes will be directed to changing or shifting subranges of R3 at time periods T5, T6, and the like, where the subrange logical address span or distance remains approximately the same size over time but shifts further to the right (e.g., increases over time into the higher logical address spaces) as time further elapses.

As illustrated in FIG. 3A, processing may be performed to analyze the LUN logical address space and identify existing logical regions R1-R4 and associated I/O access patterns and I/O intensities (as may be included in I/O access or activity information for the logical regions). The logical regions R1-R4 may be formed by identifying, within a define time period, portions or subranges of the logical address space having matching or similar I/O access characteristics, such as a similar I/O access pattern (e.g., I/O workload with similar or matching characteristics such as similar read/write split or mixture (within a specified tolerance or threshold), similar I/O block size (within a specified tolerance or threshold), matching type of sequential or random, similar I/O intensity (within a specified tolerance or threshold)).

Once the I/O access or activity information for the logical regions R1-R4 described above has been determined, such I/O access or activity information with respect to the logical address space may be used to select a storage tier from which to allocate physical storage when writing to a target logical address of the logical address space which is not mapped to any physical storage. In connection with a thin LUN, the foregoing may occur when performing an initial or first write to the target logical address which is not mapped to any physical storage slice (e.g., no I/Os have yet been issued to the target logical address and there is currently no available I/O access or activity information for the target logical address).

The example 200 of FIG. 3A may provide a snapshot of the I/O access or activity information for the logical regions R1-R4 after a number of time periods have elapsed, such as 3 time periods T1-T3. Such information collected for the 3 time periods may also be used to predict I/O access or activity information for subsequent time periods, such as T4, for regions R1-R4.

Additionally, if a data block is written to an LBA of the logical address space that has not been written to previously and no physical storage is currently mapped/allocated to the LBA, techniques herein generally use information regarding existing logical regions in the logical address space (as illustrated and described in connection with FIG. 3A) to predict the expected or anticipated I/O access pattern/characteristics for the newly written data block at the LBA as will be described in more detail below with reference to FIG. 3B.

Figure 3B:
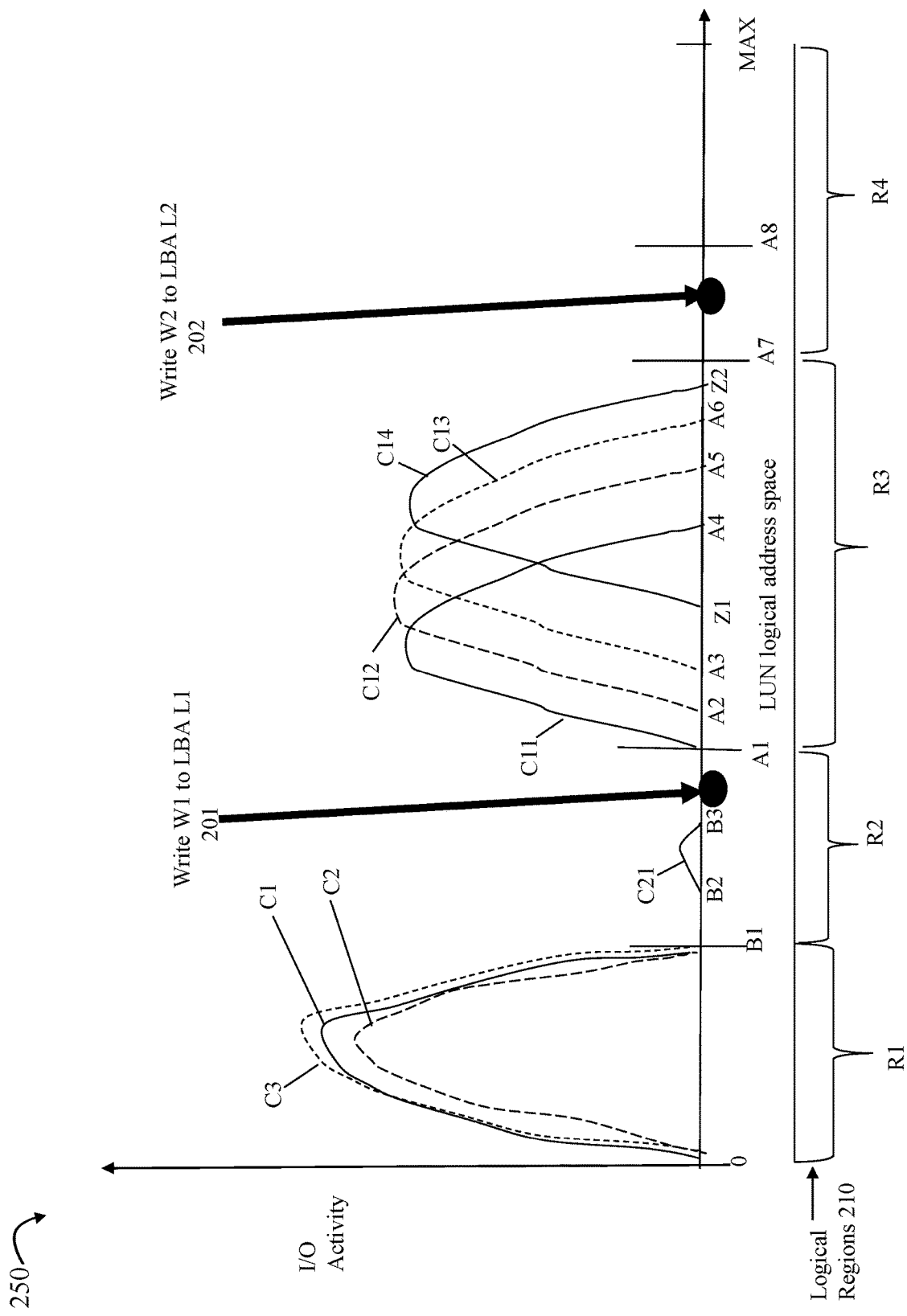

The example 250 of FIG. 3B includes the same elements as in FIG. 3A with the additional annotation for two writes W1 and W2 received at the fourth point in time T4. As noted above, the example 200 of FIG. 3A may provide a snapshot of the I/O access or activity information for the logical regions R1-R4 after 3 number of time periods T1-T3 have elapsed. At subsequent time T4, assume write W1 is issued to LBA L1 (as denoted by 201) and write W2 is issued to LBA L2 (as denoted by 202).

As a first case, consider the write W1 to LBA L1 201. LBA L1 is a target LBA within existing region R2. W1 is the first or initial write to LBA L1. LBA L1 is currently not mapped to any physical storage. Thus, W1 is a write to target LBA L1 in an unallocated logical address hole that is not mapped to physical storage. However, the target LBA L1 is within an existing sparse logical region R2. Characterization of R2 as a sparse logical region is also noted elsewhere herein whereby R2 is sparse with respect to mapped slices and therefore also has unmapped/unallocated logical subrange portions.

In connection with write W1, processing may be performed to allocate a slice of physical storage from one of the storage tiers, such as one of the 3 tiers in FIG. 2, where the newly allocated slice is used to store the data written by W1. Since LBA L1 is within region R2, techniques herein may predict that LBA L1 may have I/O access or activity characteristics that match, or are similar to, those attributed to the region R2. Thus, in an embodiment in accordance with techniques herein, I/O access or activity information of logical region R2 may be used in connection with initial slice allocation and selecting the storage tier on which to place the new data block written to target LBA L1. Subsequent to selecting the storage tier, a slice is allocated from the storage tier. The write data for W1 is stored in the newly allocated slice and the slice is mapped into the logical address space, such as to the logical address subrange B3 to A1. Processing may select the storage tier determined as best suited for an I/O workload having characteristics similar to, or matching, those of the I/O access or activity information for R2. This is described in more detail in following paragraphs.

As a second case, consider the write W2 to LBA L2 202. LBA L2 is a target LBA within existing region R4 for which there is no I/O access or activity information. R4 is a completely unmapped or unallocated logical address subrange (A7 through MAX). W2 is the first or initial write to LBA L2. LBA L2 is currently not mapped to any physical storage. Thus, W2 is a write to target LBA L2 in an unallocated logical address hole that is not mapped to physical storage. The target LBA L2 is within an existing logical region R4 for which no physical storage has been allocated (e.g., no writes have yet been made to any logical address in region R4).

In connection with write W2, processing may be performed to allocate a slice of physical storage from one of the storage tiers, such as one of the 3 tiers in FIG. 2, where the newly allocated slice is used to store the data written by W2. Since LBA L2 is within region R4, techniques herein may evaluate the temporal trends of I/O access or activity for existing regions R1-R3 which have associated I/O access or activity information. In this example, processing may evaluate the temporal trend with respect to I/O access patterns for region R3. As described above, R3 has a temporal trend of expanding or increasing in size over time. In particular, R3 has a temporal trend where the logical address UB of R3 has increased over time periods T1-T3 and which was further expected/predicted to increase to Z2 in time period T4. Additionally, it has been noted that now, at time T4, the predicted I/O activity as denoted by C14 accurately represents the actual observed I/O activity that has occurred at T4. In this manner, the temporal trend for R3 may be used to further predict that the UB of R3 is expected to continue to increase for subsequent time periods T5, T6, T7, and the like in a manner similar to that as described above in connection with time periods T1-T4. In this example, the temporal trend for R3 may be used to predict the UB for the region R3 at future point in time T7. At time T7, the temporal trend predicts that the logical region R3 will have a revised UB denoted as logical address A8 in FIG. 3B. At future time T7 using temporal trends for R3, processing may predict that target LBA L2 is expected to be included in the logical range R3. Thus, techniques herein may use I/O access and activity information of R3 in connection with allocation or placement of the data block written in W2 to target LBA L2 (202). Techniques herein may predict that LBA L2 is expected to have I/O access or activity characteristics that match, or are similar to, those attributed to the region R3. Thus, in an embodiment in accordance with techniques herein, I/O access or activity information of logical region R3 may be used in connection with initial slice allocation and selecting the storage tier on which to place the new data block written to target LBA L2. Subsequent to selecting the storage tier, a slice is allocated from the storage tier. The write data for W2 is stored in the newly allocated slice and the slice is mapped into the logical address space, such as to the logical address subrange A7 to A8. Processing may select the storage tier determined as best suited for an I/O workload having characteristics similar to, or matching, those of the I/O access or activity information for R3, as described in more detail in following paragraphs.

Periodically, an embodiment in accordance with techniques herein may perform processing to determine the logical regions in the logical address space and determine observed temporal trend characteristics of the logical regions. An embodiment in accordance with techniques herein may perform processing to identify or detect one or more types of temporal trends. For example, temporal trend detection may identify whether, over time, logical regions are stable in size (e.g., with respect to logical address span or difference between upper bound and lower bound of region), changing in size, getting larger/expanding (e.g., with respect to logical address span), or getting smaller/decreasing (e.g., with respect to logical address span). If a logical region is observed to have a temporal trend in which the logical region is expanding, in which direction(s) of logical address space (lower bound and/or upper bound of logical region) is the expansion occurring? If the logical region is getting smaller over time, in which direction(s) of logical address space (lower bound or upper bound of logical region) is the retraction/reduction in size occurring (with respect to upper bound and/or lower bound of logical region) Generally, is temporal trend analysis may determine whether the upper bound of the logical region is increasing or decreasing over time, and whether the lower bound of the logical region is increasing or decreasing over time.

An embodiment may also look for other temporal trends. For example, if a logical region is increasing or decreasing with respect to size (e.g., difference between upper bound and lower bound logical addresses) over time, by how much (e.g., identify amount of increase or decrease in size over time). If a logical region remains stable at approximately the same size, what is the temporal trend with respect to shifting upward or downward in the logical address space. For example, a logical region may remain approximately the same size but shift its upper and lower bounds upward by a specified LBA amount every 3 hours.

Generally, in connection with a write like W2 (to a target LBA not currently mapped to physical storage where the target LBA is within a logical region that does not have associated I/O access or activity information), an embodiment in accordance with techniques herein may predict boundaries of the logical regions and associated I/O access or activity information within the logical address space after a specified amount of time elapses. Subsequently, one of the regions having I/O access or activity information may be selected for use in connection with selecting a tier from which the allocate physical storage for storing the W2 write data. For example, processing may determine predicted upper bound and lower bounds of all logical regions at a particular time in the future, such as an hour from now, based on temporal trends. If the target LBA is within the predicted bounds of a logical region, then the I/O access or activity information of that particular logical region may be used to select the tier for allocation/placement of the data block written to target LBA.

In at least one embodiment in accordance with techniques, additional inputs or information may be used in combination with temporal trends, when needed, to select a storage tier from which the allocate a slice of physical storage for storing newly written data. In at least one embodiment, application profile information may be used as one of the additional inputs. The application profile information may be specified for one or more LUNs expected to be used by an application. The application profile information may specified by the user when the LUNs are configured. The user may provide application profile information characterizing the expected use of the LUNs being configured. For example, the user may specify an application type (e.g., DB server application, electronic mail server application) or particular application instance (e.g., particular DB application by a particular vendor, particular email application by a particular vendor such as Microsoft Exchange® Server by Microsoft Corporation) with respect to the application expected to issue I/Os to the LUN. Additionally, the user may identify the types of files (e.g., log file, medical image file, backup file), types of data, or more generally, types of storage objects, expected to be stored on the LUN. For example, the user may specify that the LUN is expected to be used as a large log file or logging device for the application. In this case, the entire LUN may be expected to have an access pattern of sequential writes with possibly a small amount of reads. Based on the type of storage objects expected to be stored on the LUN, different defined expected I/O patterns or characteristics typically observed with such types of storage objects may also be expected. Subsequently as I/Os are directed to the LUN, processing as described herein may be performed to collected I/O access information for the LUN and determine I/O access characteristics for different logical regions of the LUN. In at least one embodiment in accordance with techniques herein, such application profile information specified for a LUN may be used to confirm a recognized temporal trend for the logical regions of the LUN. For example, processing may recognize a temporal trend for a logical region where the logical region has an UB that has increased in terms of logical address over time. The application profile information may be used to confirm this temporal trend and increase confidence in predicting that at successive subsequent points in time, the UB of the logical region is also expected to continue to increase.

Further, consider another example in which the application profile information may be used in conjunction with the detected temporal trend based on observed I/Os to predict a future change in I/O access pattern/characteristics for a logical region. For example, the application profile information may indicate that I/Os directed to a logical region for a particular file type are expected have the following pattern: sequential writes to a sequence of LBAs, followed by sequentially reading the written data from such LBAs, followed by deleting the written data of the LBAs. At a first point in time, sequential writes to a first sequence of LBAs and a single read to one of the first sequence of LBAs has been observed. Although only a single read to one of the first sequence of LBAs has been received at the first point in time, temporal trend analysis may use the application information to detect that the single read is the beginning of an expected sequential reading trend of the first sequence of LBAs. In this manner, the application information may identify a predetermined or expected I/O access pattern, and observed I/Os may be used to identify what position in the predetermined or expected I/O pattern corresponds to a current point in time. Temporal trend analysis may then predict an I/O access pattern of sequential reads of the first LBA sequence based on portions of the pattern subsequent to the first observed sequential read of the pattern.

Once the tier is selected from which to allocate the slice, an embodiment in accordance with techniques herein may generally use any suitable technique to select a particular RAID group or PD within the tier. For example, the particular technique used to select the particular RAID group or PD within the tier may have goals including ensuring equal workload distribution among RAID groups and PDs of the tier, ensuring equal write wear leveling among PDs (e.g., if the tier is an SSD tier), and the like. An embodiment in accordance with techniques herein may provide a hint to the data storage optimizer indicating the expected I/O access pattern, for example, of the newly written data block to be placed within the selected tier. The data storage optimizer may use the hint to facilitate placement of the newly written data block within a particular RAID group or PD within the selected tier. For example, assume the selected tier from which a slice is to be allocated is the SSD tier. The hint may indicate that the I/O access or activity directed to the newly allocate slice is expected to be write-only in which case processing may select to allocate the slice from a RAID-5 group rather than a RAID-6 group within the SSD tier due to additional overhead writes incurred for RAID 6 over RAID 5. This selection of RAID 5 over RAID 6 may also be made in efforts to minimize the wear incurred in connection with writing to the PDs of the SSD tier. Thus, the hint may be provided to the data storage optimizer for use in selecting placement of the write data within a slice of a particular RAID group or PD of the selected tier.

In at least one embodiment, as noted above, selecting the storage tier from which a physical slice is allocated for storing newly written data may be characterized in one aspect as determining a best suited match between I/O characteristics or attributes of a logical region (which are predicted characteristics of the newly allocated slice and newly written data stored at the target LBA) and characteristics or attributes of candidate storage tiers. For example, characteristics of a logical region relate to I/Os directed to the logical region and may include read I/O access, activity or workload characteristics (e.g., read I/O rate, amount of data read per unit of time, what portion/percentage of reads are sequential, what portion/percentage of reads are random, average read I/O size overall, average read I/O size of random reads, average read I/O size of sequential reads, logical addresses within logical region that are accessed for read I/Os), write I/O access or activity characteristics (e.g., write I/O rate, amount of data written per unit of time, what portion/percentage of write s are sequential, what portion/percentage of write s are random, average write I/O size overall, average write I/O size of random writes (e.g., HDD not preferred for small random writes but may be suitable for larger (e.g., 2 MB) random write access pattern), average write I/O size of sequential writes, logical addresses within logical region that are accessed for write I/Os), physical storage capacity required (e.g., the size of logical region), and overall split or portion of I/Os directed to the logical region that are reads vs. writes. Characteristics of a storage tier may relate to performance and capabilities of the PDs and RAID groups in the tier. For example, characteristics of a storage tier may include performance capabilities of the PD media type of the tier (e.g., relative performance ranking of tier in comparison to other tiers), physical storage capacity of storage tier, write endurance capabilities/characteristics of the tier PDs (e.g., whether PDs are SLC or MLC (may prefer to store high write workload data on SLC having higher write endurance than MLC), current wear level or number of remaining writes in the expected PD lifetime), RAID level or configuration of RAID groups in the storage tier (e.g., RAID-5 or RAID-6 since RAID-5 may be preferred for higher write I/O workload over RAID-6 groups due to additional overhead writes needed for storing additional RAID-6 parity information), and the like. Depending on the particular characteristics or attributes used for the logical region and storage tiers, a best match or decision may be made to allocate a physical slice from a particular tier for the newly written data predicted to have specified I/O activity or access characteristics. The selected tier may have a specified I/O performance capability suitable for, or in accordance with, the I/O workload characteristics (e.g., intensity and type of I/Os, such as mostly/all reads, or mostly/all writes) predicted for the newly written data.

For example, with reference to FIGS. 2, 3A and 3B, an embodiment may determine that the I/O access or activity information of region R3 is predicted or expected to characterize the future I/O access or activity pattern of the newly written data for W2 stored at LBA L2 (202). Based on the I/O access or activity information for R3, the newly written data for W2 has a predicted high write-only workload and the slice for storing such written data W2 may be allocated from one of the PDs of the highest performance SSD tier 112. Furthermore, since I/Os to the newly written data for W2 is predicted to be write-only, the particular PDs of the SSD tier selected may have a lower amount of write wear relative to other PDs not selected. For example, the SSD tier 112 may include two RAID groups, RG1 and RG2 as illustrated in FIG. 2, each configured from PDs of the same media type (e.g., all SLCs, all MLCs). RG1 may be configured from PDs having a higher level of wear than PDs of RG2. Thus, PDs of RG1 have generally already had more writes than PDs of RG2, where RG1 has an expected remaining lifetime in terms of allowable remaining writes which is less than RG2's expected remaining lifetime in terms of allowable remaining writes. Since data of R3, and thus the new write data for W2, is predicted to be write only, a slice may be allocated from RG2 of the SSD tier (rather than RG1 of the SSD tier) since RG2 has lower wear in terms of writes (e.g., higher remaining number of allowable writes) relative to RG1. As a slight variation to having 3 tiers as in FIG. 2, consider and embodiment having an additional 4$^{th}$ tier that is also an SSD tier (e.g., there are 2 SSD tiers and 2 non-SSD tiers of HDDs). In this embodiment, a first SSD tier 1 may include RAID groups of flash drives that are SLC physical media type drives and a second SSD tier 2 may include RAID groups of flash drives that are MLC physical media type drives. In this case, since I/Os directed to the newly written W2 data are predicted to be a high write-only workload, an embodiment in accordance with techniques herein may allocate the physical slice for storing the W2 data from the SSD tier 2 of MLC flash drives (e.g., since MLC drives have a higher write endurance classification than SLC drives).

Additionally, with reference to FIGS. 2, 3A and 3B, an embodiment may determine that the I/O access or activity information of region R2 is predicted or expected to characterize the future I/O access or activity pattern of the newly written data for W1 stored at LBA L1 (201). In this case, the newly written W1 data may be stored on a slice allocated from one of the PDs of the lowest performance tier, such as the 10K RPM HDD tier 116, due to the predicted low or relatively idle I/O activity for R2.

Figure 4:
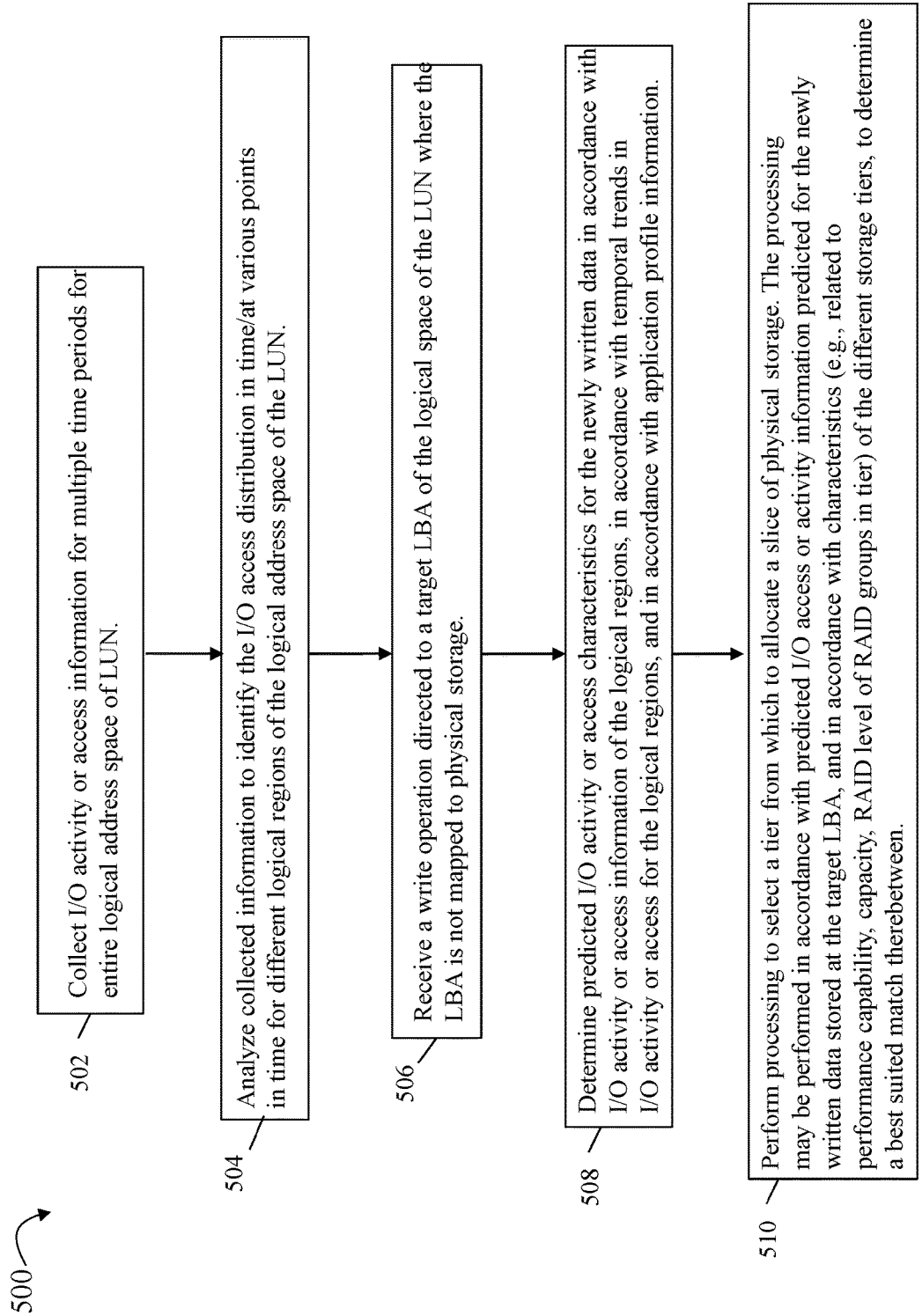
FIG. 4 is a flowchart of processing steps that may be performed in an embodiment in accordance with techniques herein.

Referring to FIG. 4, shown is a flowchart of processing steps that may be performed in an embodiment in accordance with techniques herein. The flowchart 500 summarizes processing as described above. At step 502, I/O activity or access information is collected for multiple time periods for the logical address space of a LUN. For example, with reference to FIG. 3A, step 502 may include collecting the different I/O activity or access information such as of C1-C3, C11, C12, C13 and C21 of FIG. 3A. From step 502, control proceeds to step 504. At step 504, processing is performed to analyze the collected information from step 502 to identify the I/O access distribution in time (e.g., at various points in time) for different logical regions of the logical address space of the LUN. From step 504, control proceeds to step 506. At step 506, a write I/O operation may be received that is directed to a target LBA of the logical space of the LUN where the LBA is not mapped to physical storage. From step 506, control proceeds to step 508. At step 508, processing is performed to determine predicted I/O activity or access characteristics for the newly written data in accordance with I/O activity or access information of the logical regions, in accordance with temporal trends in I/O activity or access for the logical regions, and in accordance with application profile information. From step 508, control proceeds to step 510. At step 510, processing is performed to select a tier from which to allocate a slice of physical storage. The processing of step 510 may be performed in accordance with predicted I/O access or activity information predicted for the newly written data stored at the target LBA, and in accordance with characteristics (e.g., related to performance capability, capacity, RAID level of RAID groups in tier) of the different storage tiers, to determine the selected tier as a best suited match therebetween. The slice may be allocated from the selected tier.

Figure 5:
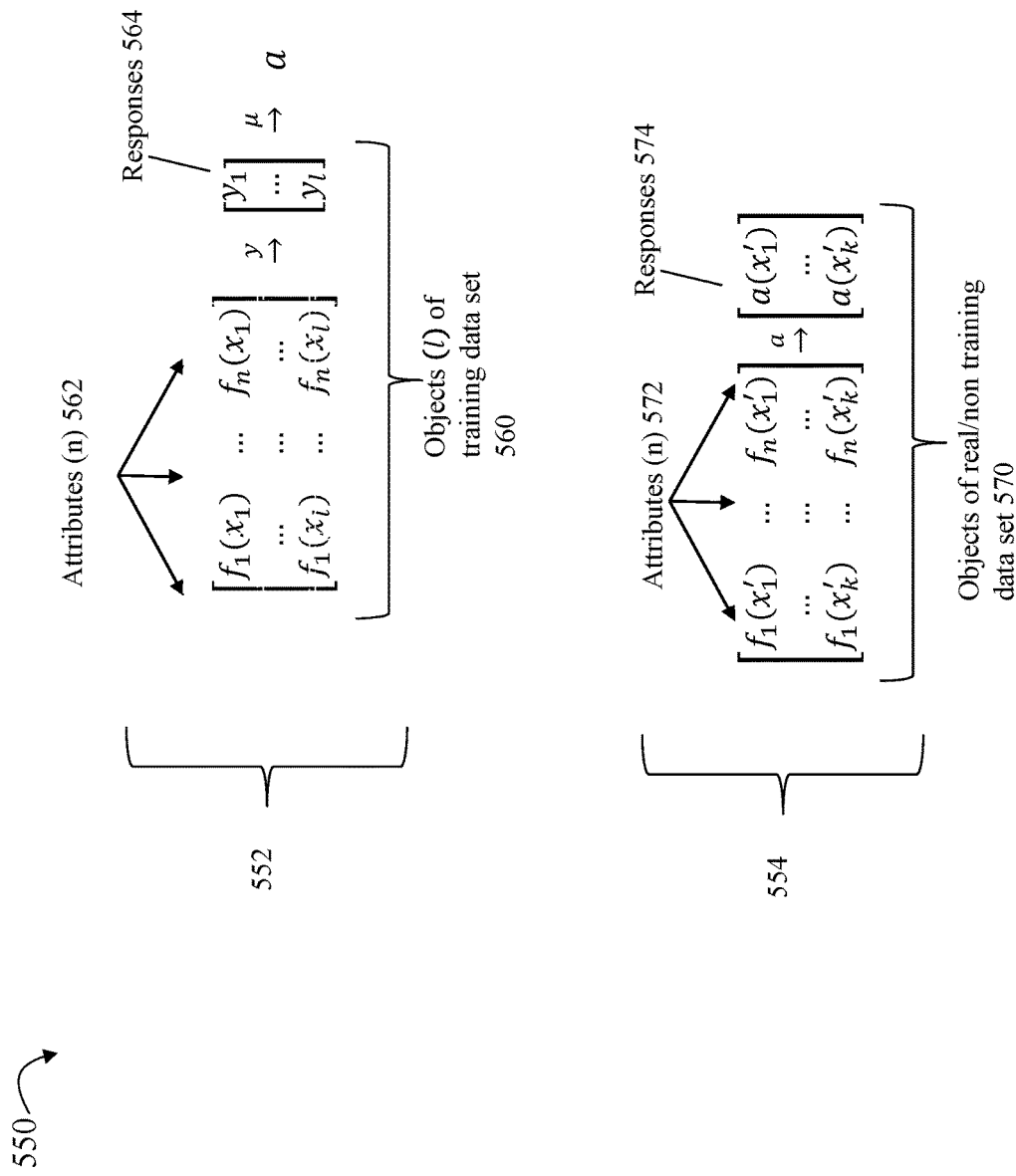
FIG. 5 is an example illustrating the machine learning approach that may be used in an embodiment in accordance with techniques herein.

In at least one embodiment in accordance with techniques herein, one or more machine learning models may be used to perform processing of techniques as described herein, such as summarized in FIG. 4. As known in the art, machine learning may be characterized in one aspect as a method of data analysis that automates analytical model building. Machine learning is based on the idea that systems can learn from data, identify patterns and make decisions. In machine learning, a machine learning model may be trained using $X^l$, denoting a training data set of "l" objects (with known responses), where $X^l=(x_i, y_i)_{i=1}^l$, "$x_i$" denotes the attributes of object "i" of the training data set; and "$y_i$" denotes the response of object "i" of the training data set. A method μ using the training data set (with known responses) $X^l=(x_i, y_i)_{i=1}^l$ builds algorithm $a=\mu(X^l)$, which can be represented as in 552 of FIG. 5. FIG. 5 is an example illustrating the machine learning approach that may be used in an embodiment in accordance with techniques herein. With reference to 552 of FIG. 5, the objects of the training data set 560 include attributes 562 and responses 564. Each i$^{th}$ row of 562 includes the "n" attributes of object "i" of the training data set 560. Each i$^{th}$ row of 564 includes the known response, $y_i$ of object "i" of the training data set 560. With reference to 554, the algorithm a (representing the trained machine learning model) may be used with real or non-training data set 570 of new objects $x_i'$ where the algorithm a calculates responses $a(x_i')$ 574 based on attributes 572. Each i$^{th}$ row of 572 includes the "n" attributes of object "i" of the real or non-training data set 570. Each i$^{th}$ row of 574 includes the calculated response, $a(x_i')$ of object "i" of the real or non-training data set 570.

In at least one embodiment, the I/O access distribution across time for the logical address space of the LUN (e.g., as illustrated in FIGS. 3A and 3B, and as in step 504 of FIG. 4) may be provided as an input to a classifier or clustering model which generates as an output groups, classes or clusters of objects. In at least one embodiment, the classifier or clustering model may be a trained machine learning model that performs clustering or classification of objects of the I/O access distribution. In at least one embodiment, the classifier or clustering model may be a linear discriminant analysis (LDA) model that performs multi-class classification or grouping of I/O operations directed to the data portions based on I/O access characteristics within the same time frame or time period. Such groups or clusters identified may correspond to I/O activity directed to logical regions in the logical address space at different time periods. Data portions located in the same logical region may be characterized as having similar or matching I/O access characteristics within one or more same defined time periods or time frame. In at least one embodiment, objects denoting I/O operations/data blocks that are included in the same group are in the same time period or time frame and have matching values for I/O access attributes. The I/O access attributes may include, for example, an I/O access type denoting whether I/O is read or write, indication of I/O operation is sequential or random, and indication of I/O block size. I/O block size may denote the size of the data read or written. The block size may be used, for example, in determining whether the I/O size is small or large (e.g., based on defined thresholds or ranges) and can be used as a characteristic in selecting a suitable storage tier for placement of a logical region's data. For example, a group may include I/O operations that are read-only and sequential, and are within the same time frame or time period. An embodiment may also take into account different and/or additional attributes. Thus, objects included in a group determined by the classifier or clustering model may denote read/written data portions that are logically related or similar in terms of access time (e.g., same time frame or period) and I/O access characteristics.

Although a particular machine learning model has been described above for use in one particular embodiment, generally, any suitable known machine learning model or methodology may be used in an embodiment in accordance with techniques herein. Additionally, processing may be performed to evaluate and compare performance of multiple different machine models to determine which particular model performs better for the different various processing, such as described in connection with techniques herein.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O (input/output) operations comprising:
   receiving a write I/O operation that writes first data to a target logical address in a logical address range, wherein physical storage is currently unallocated for the target logical address;
   selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;
   allocating the first physical storage from the first storage tier;
   storing the first data in the first physical storage, wherein the logical address range includes a plurality of logical regions to which writes have been made, each of the plurality of logical regions is associated with I/O access information characterizing I/O activity of said each logical region, and said plurality of logical regions includes the first logical region;
   determining whether the target logical address is located within a logical region of the logical address range that does not have associated I/O access information characterizing I/O activity of the logical region; and
   responsive to determining that the target logical address is located within a logical region of the logical address range that does not have associated I/O access information characterizing I/O activity of the logical region, performing processing comprising:
      determining, using temporal trend information regarding the plurality of logical regions, whether the target logical address is predicted to be included in the first logical region at a future point in time; and
      responsive to determining that the target logical address is predicted to be included in the first logical region at a future point in time, performing said selecting of the first storage tier using the first I/O access information characterizing I/O activity of the first logical region.

2. The method of claim 1, wherein the first logical region has an associated first subrange of the logical address range, the first subrange having an upper bound and a lower bound, and wherein a plurality of write I/O operations have been made to target logical addresses in the first subrange prior to receiving the write I/O operation.

3. The method of claim 1, further comprising:
   determining whether the target logical address is located in the first logical region of the logical address range; and
   responsive to determining the target logical address is located in the first logical region, selecting the first storage tier in accordance with the first I/O access information associated with the first logical region.

4. The method of claim 1, wherein the temporal trend information indicates that the first logical region has been expanding over time and thereby increasing in size with respect to a logical address subrange associated with the first logical region.

5. The method of claim 1, wherein the temporal trend information indicates that the first logical region has been decreasing in size over time with respect to a logical address subrange associated with the first logical region.

6. The method of claim 5, wherein at least two of the plurality of logical regions are different in terms of size with respect to the logical address range.

7. The method of claim 5, wherein at least one of the plurality of logical regions includes a plurality of slices allocated from one of the plurality of storage tiers.

8. The method of claim 1, wherein the temporal trend information indicates that an upper bound logical address of the first logical region changes over time.

9. The method of claim 1, wherein the temporal trend information indicates that a lower bound logical address of the first logical region changes over time.

10. The method of claim 1, wherein the temporal trend information indicates that at least one of a lower bound logical address of the first logical region and an upper bound logical address of the first logical region has not changed over time.

11. The method of claim 1, wherein each of the plurality of logical regions includes data portions having matching I/O access characteristics for a same defined time period.

12. The method of claim 1, wherein the plurality of storage tiers includes at least one tier of solid state storage devices and at least one tier of rotating disk drives.

13. The method of claim 1, wherein said first physical storage is allocated from any of a particular RAID (Redundant Array of Independent Disks) group of the first storage tier and a particular physical storage device of the first storage tier selected in accordance with at least one characteristic identified by the first I/O access information.

14. The method of claim 1, wherein the write I/O operation is an initial write to the target logical address.

15. The method of claim 1, wherein the write I/O operation is directed to a logical device having the logical address range, and wherein the logical device is virtually provisioned having physical storage allocated on demand.

16. The method of claim 15, wherein physical storage for a subrange of the logical address range of the logical device is allocated responsive to an initial write to any logical address in the subrange.

17. A method of processing I/O operations comprising:
   receiving a write I/O operation that writes first data to a target logical address in a logical address range, wherein physical storage is currently unallocated for the target logical address;

selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;

allocating the first physical storage from the first storage tier;

storing the first data in the first physical storage, wherein the write I/O operation is directed to a logical device having the logical address range, and wherein the logical device is virtually provisioned having physical storage allocated on demand, and wherein the logical address range includes a plurality of logical regions to which writes have been made, each of the plurality of logical regions is associated with I/O access information characterizing I/O activity of said each logical region, said plurality of logical regions includes the first logical region, and wherein application profile information for the logical device identifies any one or more of: an application expected to issue I/Os to the logical device; a type of application expected to issue I/Os to the logical device; and a type of storage object expected to have data stored on the logical device; and determining whether the target logical address is located within a logical region of the logical address range that does not have associated I/O access information characterizing I/O activity of the logical region; and responsive to determining that the target logical address is located within a logical region of the logical address range that does not have associated I/O access information characterizing I/O activity of the logical region, performing processing comprising:
  determining, using the application profile information and temporal trend information regarding the plurality of logical regions, whether the target logical address is predicted to be included in the first logical region at a future point in time; and
  responsive to determining that the target logical address is predicted to be included in the first logical region at a future point in time, performing said selecting of the first storage tier using the first I/O access information characterizing I/O activity of the first logical region.

18. A non-transitory computer readable medium comprising code stored thereon that, when executed, performs a method of processing I/O operations comprising:

receiving a write I/O operation that writes first data to a target logical address in a logical address range, wherein physical storage is currently unallocated for the target logical address;

selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;

allocating the first physical storage from the first storage tier;

storing the first data in the first physical storage, wherein the logical address range includes a plurality of logical regions to which writes have been made, each of the plurality of logical regions is associated with I/O access information characterizing I/O activity of said each logical region, and said plurality of logical regions includes the first logical region;

determining whether the target logical address is located within a logical region of the logical address range that does not have associated I/O access information characterizing I/O activity of the logical region; and responsive to determining that the target logical address is located within a logical region of the logical address range that does not have associated I/O access information characterizing I/O activity of the logical region, performing processing comprising:
  determining, using temporal trend information regarding the plurality of logical regions, whether the target logical address is predicted to be included in the first logical region at a future point in time; and
  responsive to determining that the target logical address is predicted to be included in the first logical region at a future point in time, performing said selecting of the first storage tier using the first I/O access information characterizing I/O activity of the first logical region.

19. A system comprising:
at least one processor; and
a memory comprising code stored thereon that, when executed, performs a method of processing I/O operations comprising:

receiving a write I/O operation that writes first data to a target logical address in a logical address range, wherein physical storage is currently unallocated for the target logical address;

selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;

allocating the first physical storage from the first storage tier;

storing the first data in the first physical storage, wherein the logical address range includes a plurality of logical regions to which writes have been made, each of the plurality of logical regions is associated with I/O access information characterizing I/O activity of said each logical region, and said plurality of logical regions includes the first logical region;

determining whether the target logical address is located within a logical region of the logical address range that does not have associated I/O access information characterizing I/O activity of the logical region; and responsive to determining that the target logical address is located within a logical region of the logical address range that does not have associated I/O access information characterizing I/O activity of the logical region, performing processing comprising:
  determining, using temporal trend information regarding the plurality of logical regions, whether the target logical address is predicted to be included in the first logical region at a future point in time; and
  responsive to determining that the target logical address is predicted to be included in the first logical region at a future point in time, performing said selecting of the first storage tier using the first I/O access information characterizing I/O activity of the first logical region.

20. A non-transitory computer readable medium comprising code stored thereon that, when executed, performs a method of processing I/O operations comprising:
- receiving a write I/O operation that writes first data to a target logical address in a logical address range, wherein physical storage is currently unallocated for the target logical address;
- selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;
- allocating the first physical storage from the first storage tier;
- storing the first data in the first physical storage, wherein the write I/O operation is directed to a logical device having the logical address range, and wherein the logical device is virtually provisioned having physical storage allocated on demand, and wherein the logical address range includes a plurality of logical regions to which writes have been made, each of the plurality of logical regions is associated with I/O access information characterizing I/O activity of said each logical region, said plurality of logical regions includes the first logical region, and wherein application profile information for the logical device identifies any one or more of: an application expected to issue I/Os to the logical device; a type of application expected to issue I/Os to the logical device; and a type of storage object expected to have data stored on the logical device;
- determining whether the target logical address is located within a logical region of the logical address range that does not have associated I/O access information characterizing I/O activity of the logical region; and
- responsive to determining that the target logical address is located within a logical region of the logical address range that does not have associated I/O access information characterizing I/O activity of the logical region, performing processing comprising:
  - determining, using the application profile information and temporal trend information regarding the plurality of logical regions, whether the target logical address is predicted to be included in the first logical region at a future point in time; and
  - responsive to determining that the target logical address is predicted to be included in the first logical region at a future point in time, performing said selecting of the first storage tier using the first I/O access information characterizing I/O activity of the first logical region.

21. A system comprising:
- at least one processor; and
- a memory comprising code stored thereon that, when executed, performs a method of processing I/O operations comprising:
  - receiving a write I/O operation that writes first data to a target logical address in a logical address range, wherein physical storage is currently unallocated for the target logical address;
  - selecting a first of a plurality of storage tiers from which to allocate first physical storage for storing the first data, wherein said selecting uses first I/O access information characterizing I/O activity of a first logical region of the logical address range and uses performance and capability characteristics of the plurality of storage tiers to select the first storage tier;
  - allocating the first physical storage from the first storage tier;
  - storing the first data in the first physical storage, wherein the write I/O operation is directed to a logical device having the logical address range, and wherein the logical device is virtually provisioned having physical storage allocated on demand, and wherein the logical address range includes a plurality of logical regions to which writes have been made, each of the plurality of logical regions is associated with I/O access information characterizing I/O activity of said each logical region, said plurality of logical regions includes the first logical region, and wherein application profile information for the logical device identifies any one or more of: an application expected to issue I/Os to the logical device; a type of application expected to issue I/Os to the logical device; and a type of storage object expected to have data stored on the logical device;
  - determining whether the target logical address is located within a logical region of the logical address range that does not have associated I/O access information characterizing I/O activity of the logical region; and
  - responsive to determining that the target logical address is located within a logical region of the logical address range that does not have associated I/O access information characterizing I/O activity of the logical region, performing processing comprising:
    - determining, using the application profile information and temporal trend information regarding the plurality of logical regions, whether the target logical address is predicted to be included in the first logical region at a future point in time; and
    - responsive to determining that the target logical address is predicted to be included in the first logical region at a future point in time, performing said selecting of the first storage tier using the first I/O access information characterizing I/O activity of the first logical region.

* * * * *